US009211674B2

(12) United States Patent
Van Tooren

(10) Patent No.: US 9,211,674 B2
(45) Date of Patent: Dec. 15, 2015

(54) METHOD FOR BONDING A THERMOPLASTIC POLYMER TO A THERMOSETTING POLYMER COMPONENT

(75) Inventor: Michael Johannes Leonardus Van Tooren, Delft (NL)

(73) Assignee: Fokker Aerostructures B.V., Papendrecht (NL)

( * ) Notice: Subject to any disclaimer, the term of this patent is extended or adjusted under 35 U.S.C. 154(b) by 0 days.

(21) Appl. No.: 14/119,974

(22) PCT Filed: May 25, 2012

(86) PCT No.: PCT/NL2012/000035
§ 371 (c)(1), (2), (4) Date: Feb. 13, 2014

(87) PCT Pub. No.: WO2012/161569
PCT Pub. Date: Nov. 29, 2012

(65) Prior Publication Data

US 2014/0220356 A1 Aug. 7, 2014

(30) Foreign Application Priority Data

May 25, 2011 (NL) .................................... 2006848

(51) Int. Cl.
*B29C 65/00* (2006.01)
*B29C 65/02* (2006.01)
(Continued)

(52) U.S. Cl.
CPC ............... *B29C 66/348* (2013.01); *B29C 65/02* (2013.01); *B29C 65/3468* (2013.01);
(Continued)

(58) Field of Classification Search
CPC .............. B29C 65/3468; B29C 66/003; B29C 66/73755; B29C 66/7392; B29C 66/7394; B29C 66/348
USPC ................ 156/73.1, 73.5, 73.6, 306.6, 307.1, 156/307.7, 308.2, 309.6
See application file for complete search history.

(56) References Cited

U.S. PATENT DOCUMENTS 3,022,814 A * 2/1962 Bodine, Jr. .................. 156/73.1
5,916,469 A * 6/1999 Scoles et al. ................. 219/633
(Continued)

FOREIGN PATENT DOCUMENTS

WO 2007/109855 A1 10/2007
WO 2008/028224 A1 3/2008

OTHER PUBLICATIONS

"Epoxy Adhesive Application Guide" from epotek.com 2009.*
(Continued)

*Primary Examiner* — John Goff
(74) *Attorney, Agent, or Firm* — Renner, Otto, Boisselle & Sklar, LLP

(57) ABSTRACT

The invention relates to a method for bonding a thermoplastic polymer to a thermosetting polymer component, the thermoplastic polymer having a melting temperature that exceeds the curing temperature of the thermosetting polymer. The method comprises the steps of providing a cured thermosetting polymer component comprising an implant of a thermoplastic polymer at least at the part of the thermosetting polymer component to be bonded, locating a thermoplastic polymer in contact with at least the part to be bonded, heating the assembly to the melting temperature of the thermoplastic polymer, whereby the thermoplastic polymer of the implant melts and fuses with the thermoplastic polymer, and cooling the assembly. The thermoplastic polymer has a melting temperature that exceeds the curing temperature of the thermosetting polymer, and the implant is designed such that heating above the maximum operating temperature of the thermosetting polymer at the interface of the implant with the thermosetting polymer component is avoided during the bonding step.

12 Claims, 2 Drawing Sheets

9 1 4 10 11 3 8 8 2 7 5 6 7 2

(51) Int. Cl.

| | |
|---|---|
| ***B32B 27/08*** | (2006.01) |
| ***B32B 37/06*** | (2006.01) |
| ***B32B 3/18*** | (2006.01) |
| *B29C 65/18* | (2006.01) |
| *B29C 65/34* | (2006.01) |
| *B29C 65/76* | (2006.01) |

(52) U.S. Cl.

CPC .......... *B29C 65/3488* (2013.01); *B29C 66/003* (2013.01); *B29C 66/0342* (2013.01); *B29C 66/474* (2013.01); *B29C 66/723* (2013.01); *B29C 66/72141* (2013.01); *B29C 66/7392* (2013.01); *B29C 66/7394* (2013.01); *B29C 66/73116* (2013.01); *B29C 66/73755* (2013.01); *B29C 66/73941* (2013.01); *B29C 66/91411* (2013.01); *B29C 66/91931* (2013.01); *B29C 66/91935* (2013.01); *B32B 3/18* (2013.01); *B32B 27/08* (2013.01); *B32B 37/06* (2013.01); *B29C 65/18* (2013.01); *B29C 65/34* (2013.01); *B29C 65/3408* (2013.01); *B29C 65/3476* (2013.01); *B29C 65/3492* (2013.01); *B29C 65/76* (2013.01); *B29C 66/71* (2013.01); *B29C 66/721* (2013.01); *B29C 66/7212* (2013.01); *B29C 66/72525* (2013.01); *B29C 66/73751* (2013.01); *B29C 66/73753* (2013.01); *B29C 66/87445* (2013.01); *B29C 66/919* (2013.01); *B29C 66/91943* (2013.01); *B29C 66/929* (2013.01); *Y10T 428/31511* (2015.04); *Y10T 428/31533* (2015.04); *Y10T 428/31721* (2015.04)

(56) References Cited

U.S. PATENT DOCUMENTS

| | | | | |
|---|---|---|---|---|
| 2002/0113066 | A1 | 8/2002 | Stark et al. | |
| 2009/0246548 | A1* | 10/2009 | Hou et al. | 428/515 |
| 2010/0173161 | A1* | 7/2010 | Beehag et al. | 428/411.1 |

OTHER PUBLICATIONS

"Thermoplastic Composites" from comfil.biz as captured by archive.org on Feb. 16, 2011.*

"Thermal stability and degradation kinetics of novel organic/inorganic epoxy hybrid containing nitrogen/silicon/phosphorus by sol-gel method" Chiang et al. Nov. 2006.*

International Search Report and Written Opinion for corresponding Internatinal Application No. PCT/NL2012/000035 mailed Sep. 24, 2012.

International Preliminary Report on Patentability for corresponding International Application No. PCT/NL2012/000035 mailed May 10, 2013.

Pratt et al., "Method of Ultrasonically Welding Rim Parts Using Thermoplastic Inserts", Motorola Technical Developments, vol. 27, May 1, 1996, pp. 200-201.

* cited by examiner

METHOD FOR BONDING A THERMOPLASTIC POLYMER TO A THERMOSETTING POLYMER COMPONENT

This application is a national phase of International Application No. PCT/NL2012/000035 filed May 25, 2012 and published in the English language and claims priority to NL Application No. 2006848 filed May 25, 2011.

FIELD OF THE INVENTION

The present invention relates to a method for bonding a thermoplastic polymer to a thermosetting polymer component. The invention also relates to a method for bonding a thermosetting polymer component to another thermosetting polymer component. The invention further relates to a cured thermosetting polymer component comprising an implant of a thermoplastic polymer at least at the part of the thermosetting polymer component to be bonded, and to an uncured or partly cured thermosetting polymer component having an implant of a thermoplastic polymer that forms a bondable surface. The invention further relates to an assembly of a cured thermosetting polymer component with a thermoplastic surface and a thermoplastic polymer component welded thereto.

BACKGROUND OF THE INVENTION

Thermoplastic (fibre reinforced) polymers, including oligomers are increasingly used as a construction material because it offers the possibility for recycling. A thermoplastic polymer can be heated to soften it (amorphous thermoplastics) or to ultimately melt it (semi-crystalline thermoplastics), and then cooled to return it to its solid state. Such temperature-induced physical changes are generally reversible which makes thermoplastic polymers recyclable. In solid amorphous thermoplastics the polymer molecular chains are arranged in a random fashion, whereas in solid semi-crystalline thermoplastics some portions thereof comprise polymer molecular chains arranged in an orderly fashion: the crystalline regions. The invention is not limited to one type of thermoplastic polymer, even if the wording 'melting' or 'melt' is used. Thermoplastic polymers exhibit a glass transition temperature (Tg) above which, with further heating, progressive softening occurs. At temperatures substantially higher than the glass transition temperature, amorphous thermoplastics behave like a high viscosity liquid, whereas semi-crystalline polymers are still solid in this temperature region. Semi-crystalline thermoplastics exhibit a melting temperature (Tm), above which the material melts and behaves as a liquid. With further increases in temperature the viscosity falls off quickly.

Thermosetting polymers are typically cross-linked polymers that comprise resins such as epoxide (often called epoxy), bismaleimide, unsaturated polyester and vinylester polymers. A thermosetting polymer typically comprises prior to curing a resin (a monomer) and a hardener, which react together to produce a cross-linked polymer. Curing may be designed to occur at room temperature or at higher temperatures, which typically ranges between 80 and 200° C. During curing, the monomer and hardener react and the viscosity of the mixture increases until it becomes a cross-linked solid polymer, which state is not reversible by a temperature change, unless the thermosetting polymer is degraded at a temperature above its degradation temperature. After curing, a thermosetting polymer also exhibits a glass transition temperature, above which considerable softening of the thermosetting polymer occurs and the thermosetting polymer behaves like a rubber.

Polymer composite materials comprise a fibre or particulate reinforcement embedded in a matrix polymer, which can be either thermosetting or thermoplastic. Well-known polymer composites include glass fibre reinforced polyester resin, and carbon fibre reinforced epoxy. Both these composites use thermosetting polymers as the matrix, and are therefore often called thermosetting composites.

One major drawback of thermosetting (composite) polymers is that they are generally not weldable, since a thermosetting polymer cannot be melted and resolidified by raising and lowering the temperature. Thermosetting (composite) polymers are typically adhered to other components by adhesive bonding or bolting, both of which have disadvantages. Adhesive bonding is costly, sometimes hazardous to the environment, and the quality of bonding achieved is generally sensitive to variations in process parameters. Bolting on the other hand produces holes in the components to be bonded, which gives rise to stress concentrations and premature failure possibly.

It would be desirable to provide a wider range of thermosetting polymers or thermosetting polymer composites with the possibility to bond them by welding to another thermosetting polymer or thermosetting polymer composite or to a thermoplastic polymer (composite).

The present invention provides a method for bonding a thermosetting polymer (composite) component to another thermosetting polymer component by providing the thermosetting polymer (composite) with an thermoplastic implant, which offers a thermally bondable surface.

The invention further provides a cured thermosetting polymer component comprising an implant of a thermoplastic polymer at least at the part of the thermosetting polymer component to be bonded, as well as an uncured or partly cured thermosetting polymer component having an implant of a thermoplastic polymer that forms a bondable surface.

The invention also provides an assembly of a cured thermosetting polymer component with a thermoplastic surface and a thermoplastic polymer.

The present invention further provides an uncured or partly cured thermosetting polymer component having an implant of a thermoplastic polymer (component) that forms a thermally bondable surface, and an assembly of a cured thermosetting polymer component with a thermoplastic surface and a thermoplastic polymer component welded thereto.

SUMMARY OF THE INVENTION

In a first aspect, the invention provides a method for bonding a thermoplastic polymer (component) to a thermosetting polymer component, the thermoplastic polymer having a melting temperature that exceeds the curing temperature of the thermosetting polymer, the method comprising the steps of a) providing a thermoplastic polymer, b) providing an uncured or partly cured thermosetting polymer component having a curing temperature below the melting temperature of the thermoplastic polymer and comprising an implant of a thermoplastic polymer at least at the part of the thermosetting polymer component to be bonded, c) locating the thermoplastic polymer in contact with at least the part to be bonded, d) heating the thermoplastic polymer and thermosetting polymer component to the melting temperature of the thermoplastic polymer, whereby the thermoplastic polymer of the implant melts and fuses with the thermoplastic polymer, and whereby the uncured thermosetting polymer component and the thermoplastic polymer of the implant at least partly interpenetrate; and e) cooling the assembly of thermoplastic polymer and cured thermosetting polymer component such that the thermoplastic polymer is bonded to the cured thermosetting polymer component, wherein the thermoplastic polymer has a melting temperature that exceeds the curing temperature of the thermosetting polymer, and the implant is designed such that heating above the maximum operating temperature of the thermosetting polymer at the interface of the implant with the thermosetting polymer component is avoided during the bonding step d).

The maximum operating temperature of a polymer (composite) is well known to the person skilled in the art and typically provided by the supplier.

In the method according to the invention, the implant of thermoplastic polymer acts as a heat sink for the thermosetting polymer (composite) component, whereby the heat applied to melt the thermoplastic polymer to be bonded and the thermoplastic polymer of the implant is located substantially at the interface to be welded, whereas this heat is absorbed by melting of the thermoplastic polymer of the implant. According to the invention, a temperature gradient is maintained in the thermoplastic implant during thermal bonding by welding such that the temperature at the interface of the implant with the thermosetting polymer (composite) component is sufficiently low not to substantially degrade the thermosetting polymer, even when heating is above such degradation temperature. This avoids excessive heating at the interface between thermosetting polymer (composite) and the implant, and therefore offers the possibility to bond a thermoplastic polymer to a thermosetting polymer component, which thermoplastic polymer has a melting temperature that exceeds the curing temperature of the thermosetting polymer, by welding.

The above described advantage is in particular useful for aerospace and aircraft applications, where the relatively high temperatures of use dictate using thermoplastic polymers with a relatively high melting temperature.

In an embodiment of the invention, the heat applied to the assembly per unit of length during step d), in particular the welding heat per unit of length is also material specific, and depends on a number of factors such as the welding method used, the specific heat capacity of the material to be welded, its conductivity and the time required to sustain the molten state in order to obtain a well consolidated material after local heating or welding. The welding heat per unit of length can readily be determined experimentally by a person skilled in the art.

In another embodiment of the invention, a method is provided wherein heat sinks are applied to parts of the implant, more preferably external to the implant, and most preferably at the outer edges of the implant. Suitable heat sinks comprise blocks, strips, bars and the like of a material, typically used as a heat sink material, in particular having a relatively high specific heat capacity. Suitable materials include metals. The interface of the heat sinks with the implant may further be provided with a heat absorbing paste for instance. The heat sinks are removed after bonding.

The implants of the thermosetting polymer component preferably comprise reinforcing fibers. In yet another embodiment of the invention, a method in provided wherein the implant comprises reinforcing fibers that extend into the thermosetting polymer. Such an embodiment allows to reduce the welding heat and/or time, thereby avoiding degradation of the thermoplastic and/or thermosetting polymer during bonding while still obtaining a satisfactory bond strength.

In another aspect of the invention, a method is provided for bonding a thermosetting polymer component to another thermosetting polymer component, in which method the the thermoplastic polymer is provided in the form of a cured thermosetting polymer component comprising an implant of the thermoplastic polymer.

In yet another aspect of the invention a cured thermosetting polymer component is provided comprising an implant of a thermoplastic polymer at least at the part of the thermosetting polymer component to be bonded.

In a preferred embodiment of the first aspect of the invention, a method is provided wherein the implant is designed such that excessive heating at the interface of the implant with the thermosetting polymer component is avoided.

In another preferred embodiment of the invention, a method is provided wherein the thermosetting polymer component comprises a fiber-reinforced thermosetting polymer composite component.

Still another preferred embodiment of the method according to the invention is characterized in that the thermosetting polymer component is an assembly of stacked pre-impregnated thermosetting polymer composite tapes and an implant comprising stacked pre-impregnated thermoplastic polymer composite tapes.

A further embodiment of the method according to the invention relates to a method wherein the thermoplastic polymer to be bonded is a thermoplastic polymer component or a component with a compatible thermoplastic polymer surface.

Another preferred embodiment of the method according to the invention makes use of a thermoplastic polymer to be bonded and/or a thermoplastic polymer of the implant that is selected from the class of engineering thermoplastic polymers having a melting temperature of at least 200° C. In an even more preferred method, the thermoplastic polymer to be bonded and/or the thermoplastic polymer of the implant is selected from polyetherimide (PEI), polyetheretherketone (PEEK), polyphenylene sulphide (PPS), polyetherketone (PEK), polyetherketoneketone (PEKK) and combinations or equivalents thereof.

Another embodiment of the method in accordance with the invention is characterized in that the thermoplastic polymer to be bonded or the thermoplastic polymer of the implant comprises electrical conductive particles for localised heating.

In an embodiment of the method according to the invention the thermosetting polymer comprises an epoxy and/or bismaleimide resin/hardener mixture.

The uncured or partly cured thermosetting polymer component having an implant of a thermoplastic polymer that forms a bondable surface can conveniently be made by stacking pre-impregnated thermosetting polymer composite tapes and stacking pre-impregnated thermoplastic polymer composite tapes forming the implant. The thermoplastic implants can also be made in-situ by using injection techniques. Co-injection of thermosetting and thermoplastic polymers is also possible.

The thermosetting polymer component comprising the implant is preferably bonded to a thermoplastic polymer (component) or to another thermosetting polymer component comprising the implant by welding to another thermosetting polymer or thermosetting polymer composite or to a thermoplastic polymer (composite).

Preferred welding techniques include induction welding, resistance welding and laser welding, without being limited thereto.

In another aspect of the invention, an assembly of a cured thermosetting polymer component with a thermoplastic surface and a thermoplastic polymer component welded thereto is provided, the thermoplastic polymer having a melting temperature that exceeds the curing temperature of the thermosetting polymer.

In either of the above embodiments of the invention, the thermoplastic polymer implant and the uncured thermosetting polymer or thermosetting polymer composite that is adjacent to the implant are able to, when heated, at least partly interpenetrate before the thermosetting polymer cures, thereby bonding the thermoplastic polymer implant to the thermosetting polymer or thermosetting polymer composite. This ensures that the thermoplastic surface offered to the thermosetting polymer (composite) by the implant cannot be readily removed from the thermosetting polymer or thermosetting polymer composite.

A cured or uncured thermosetting polymer or thermosetting polymer composite with a thermoplastic implant may be bonded to a further thermoplastic polymer in accordance with the invented method, or may be bonded to a second thermosetting polymer or thermosetting polymer composite, provided with a thermoplastic implant.

A further advantage of the invented method is that the molten thermoplastic polymer to be bonded and the thermoplastic polymer of the implant provide high thermoplastic polymer flow when placed in contact with each other, thereby filling any undulations or imperfections in the contacted surfaces to be bonded. The thermoplastic flow may be influenced by altering the temperature and/or by applying more contact pressure to the components to be bonded during heating or allowing additional time for bonding.

An advantage of the method of the invention further relates to the fact that components that were previously bonded to each other may be dismantled and reassembled again when this is desired, simply by reheating the welded thermoplastic and thermoplastic implant at least partially. If desired, additional thermoplastic polymer may be added between the surfaces to be bonded for a better bond. Reheating may also be of use to improve the quality of the weld produced, if desired in selected areas.

Generally, the method according to the invention will be carried out at a temperature above the glass transition temperature of the cured thermosetting polymer or polymer composite component, at least at the interface between thermoplastic polymer implant and the thermosetting polymer. However, bonding may involve a temperature that is only slightly higher than this temperature, or may even be close to the degradation temperature of the thermosetting polymer.

The thermosetting polymer (composite) component may comprise other components, such as metal inserts, foam or honeycomb core, thermoplastic of thermosetting components or films, bonded thereto by other methods than according to the invention, or any other material that can be incorporated as an integral part of a thermosetting (composite) component.

BRIEF DESCRIPTION OF THE FIGURES

The invention will now be described in more detail by way of example, without however being limited thereto and with reference to the accompanying figures in which.

DESCRIPTION OF PREFERRED EMBODIMENTS

Figure 1:
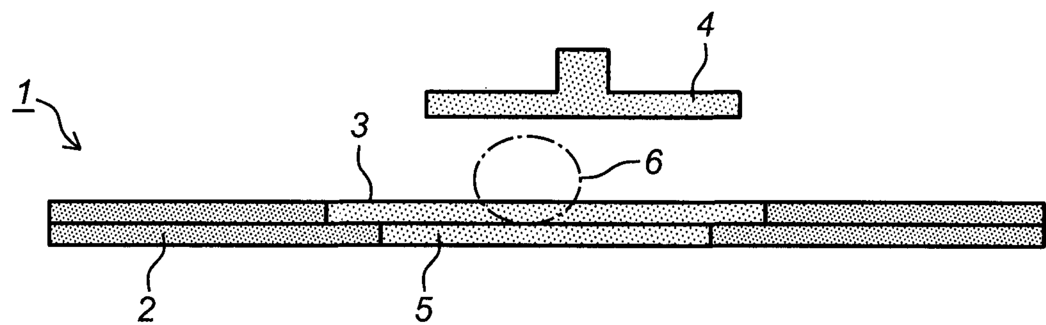
FIG. 1 illustrates a first embodiment of a cured thermosetting polymer component with a thermoplastic surface and a thermoplastic polymer component to be welded thereto according to the invention.

With reference to FIG. 1, an embodiment of an assembly 1 of a cured thermosetting polymer component 2 with a thermoplastic surface 3 is shown, to which a thermoplastic polymer component 4 can be welded in accordance with the method of the invention is shown. The thermoplastic polymer of the thermoplastic polymer component 4 has a melting temperature between 250° C. and 400° C., which exceeds the curing temperature of the thermosetting polymer used in the thermosetting polymer component 2, which curing temperature ranges between about room temperature and 200° C. typically. The assembly 1 has been obtained by a method that comprises providing an uncured or partly cured thermosetting polymer (the precursor of the cured component 2) with an implant 5 of a thermoplastic polymer at least at the part of the thermosetting polymer component to be bonded, which is the surface 3 in the present case, and curing the thermosetting polymer, whereby the uncured thermosetting polymer component 2 and the thermoplastic polymer of the implant 5 at least partly interpenetrate. This process forms a bond between the thermoplastic polymer implant 5 and the cured thermosetting polymer 2. Due to the elevated temperature of curing, thermosetting monomers may actually migrate easier through the thermoplastic polymer of the implant 5, in particular the crystalline domains thereof. In this way a strong bond is formed between the two. Obviously, the curing temperature and time cycle is preferably selected such that the thermosetting monomers (and hardener) are able to migrate sufficiently deep into the molten polymer of the implant 5. Providing the thermosetting polymer 2 with the thermoplastic implant 5 may be carried out without altering the manufacturer's recommended curing cycle for the thermosetting polymer 2. However, a slight alteration may be required, in particular when the compatibility between the thermosetting polymer 2 and the thermoplastic polymer of implant 5 is not optimal.

According to the invention, the thermoplastic polymer (component) 4 is brought in contact with at least the surface 3 of assembly 1 and the thermoplastic polymer and thermosetting polymer component heated to the melting temperature of the thermoplastic polymer 4, whereby the thermoplastic polymer of the implant 5 melts and fuses with the thermoplastic polymer (component) 4, in other words forms a bond between the thermoplastic polymer implant 5 and the thermoplastic polymer (component) 4, which bond is consolidated upon cooling the assembly 1 of thermoplastic polymer 5 and cured thermosetting polymer component 2.

In order to avoid excessive heating of the thermosetting polymer during the bonding process, the welding zone should be selected in accordance with the geometry of the thermoplastic implant 5. In FIG. 1, a weldable area is schematically shown as area 6. Heating in this area 6 can be done at the melting temperature of one or both of the thermoplastic polymers 4 and 5. These polymers 4 and 5 preferably have a melting temperature that differs by 20° C. only, more preferred by 15° C. and most preferred by 10° C. only. Preferably, thermoplastic polymers 4 and 5 are substantially the same polymer. The thermoplastic polymer of the implant 5 is bonded to an internal surface (as in the Example shown in FIG. 1) or to an external surface (as in the Example shown in FIG. 2) of the thermosetting polymer 2 during the curing of the thermosetting polymer 2, preferably by forming a semi-interpenetrating polymer network. To this end, the thermoplastic polymer 5 is preferably compatible with the chosen thermosetting monomers of the thermosetting polymer 2. The person skilled in the art of polymer science has sufficient tools at his disposal, such as well known thermodynamic and solubility criteria.

Typical bond strength achievable using the method according to the invention exceeds 30 MPa, more preferably exceeds 35 MPa, and most preferably exceeds 40 MPa (double lap joint strength test).

Typical welding pressures range from 50 kPa to 1 MPa, with a range from 100 kPa to 350 kPa being preferred. However, the method according to the invention may also provide good bonds when no pressure is applied, but pressures exceeding 1 MPa may also be used, although such pressures may entail some squeezing out of molten thermoplastic.

Figure 2:
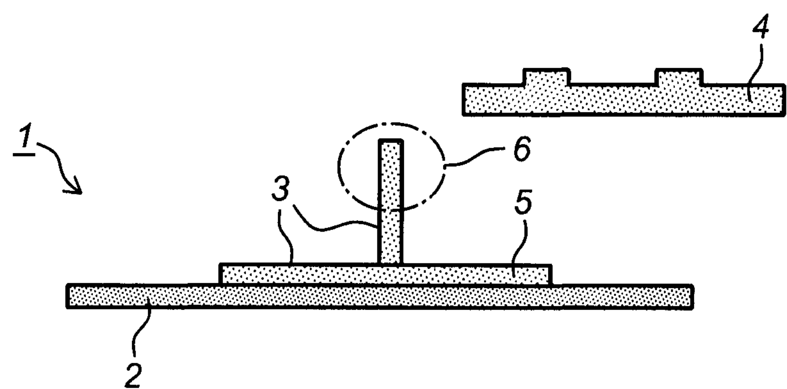
FIG. 2 represents a second embodiment of a cured thermosetting polymer component with a thermoplastic surface and a thermoplastic polymer component to be welded thereto according to the invention.

Another embodiment of an assembly 1 of a cured thermosetting polymer component 2 with a thermoplastic surface 3 is shown, to which a thermoplastic polymer component 4 can be welded in accordance with the method of the invention is shown in FIG. 2. In this case, the thermoplastic polymer implant 5 is actually bonded to an outward surface of the thermosetting polymer component 2. Yet, its function is still according to the invention since the implant 5 is dimensioned such that when limiting the weldable area to area 6, excessive heating of the thermosetting polymer at the interface with implant 5 is avoided.

The thermosetting polymer 2, provided with a thermoplastic polymer implant 5 may be joined to a thermoplastic component 4 under the provision of external heat and pressure, such as a heated plate for instance. Alternatively, a local heating element or even heatable materials incorporated within the components to be bonded may be used, allowing heat to be focused in the welding area 6.

Since in the method according to the invention heating occurs above the melt temperature of the thermoplastic polymers 4 and 5, these thermoplastics will exhibit substantial flow during welding, even under relatively low welding pressures. This flow allows the thermoplastics 4 and 5 to fill small irregularities in their surfaces or even relatively small gaps between the components 2 and 4 to be welded.

Figure 3:
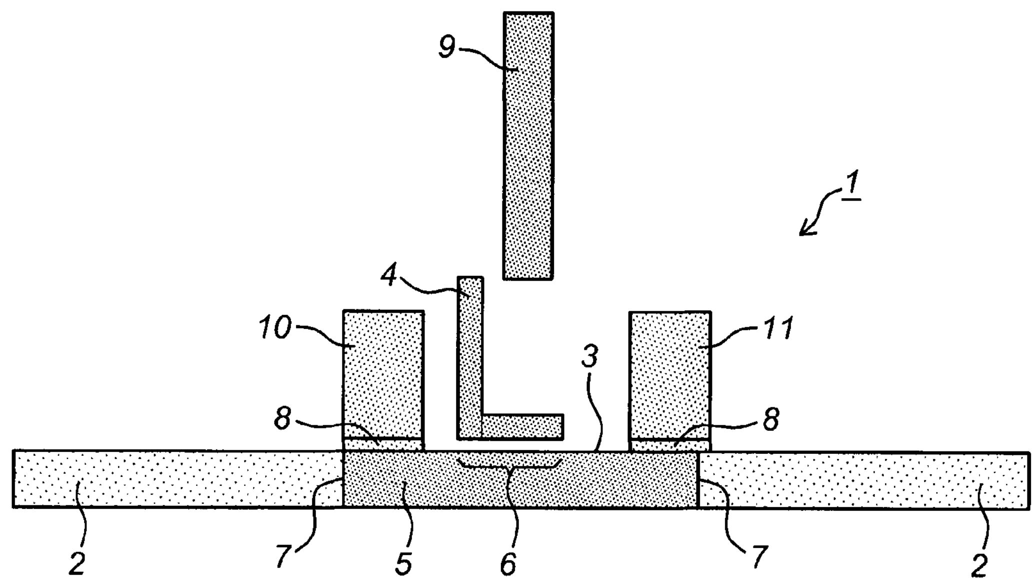
FIG. 3 represents another embodiment of a cured thermosetting polymer component with a thermoplastic surface and a thermoplastic polymer component to be welded thereto according to the invention.

Still another embodiment of an assembly 1 of a cured thermosetting polymer component 2 with a thermoplastic surface 3, to which a thermoplastic polymer component 4 can be welded in accordance with the method of the invention is shown in FIG. 3. In this case, the thermoplastic polymer implant 5 is provided with two heat sinks 10 and 11, provided at its outer edges. The implant 5 is dimensioned such that when limiting the weldable area to area 6, heating of the thermosetting polymer 2 at the interface 7 with implant 5 is limited such that the maximum operating temperature of the thermosetting polymer is not exceeded. The heat sinks 10 and 11 absorb a part of the welding heat. The heat sinks 10 and 11 are provided to the implant 5 by using layers of a heat absorbing paste 8. The thermosetting polymer 2, provided with the thermoplastic polymer implant 5 is joined to the thermoplastic component 4 by using a welding torch 9 which is brought in contact with the welded part 4 within the area of contact 6.

Figure 4:
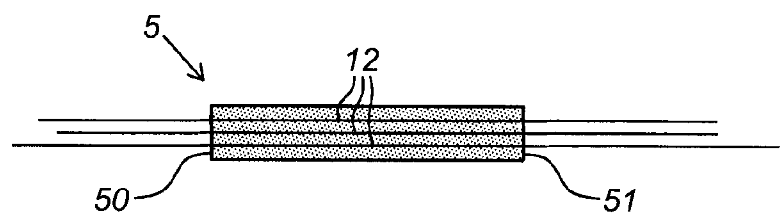
FIG. 4 schematically illustrates an embodiment of a thermoplastic implant to be used in the method of the invention.

FIG. 4 finally illustrates a schematic side view of a preferred implant to be used in the method of the invention. In the embodiment shown, an implant of a thermoplastic polymer is provided, comprising continuous reinforcing fibers 12 that extend further then the boundaries (50, 51) of the implant 5. When consolidating such an implant with a thermosetting polymer component, the free (dry) parts of the fibers 12 will extend into the thermosetting polymer where these fiber parts will be wetted with thermosetting polymer and become integrated with the thermosetting polymer component once cured. It has turned out that an implant according to this embodiment is particularly useful in the method of the invention since it allows to yield satisfactory bond strengths yet limiting the heat applied during bonding.

The method according to the invention further permits unwelding and separation of previously welded components 2 and 4. The components (2, 4) are thereto heated to a temperature above the melt temperature of the thermoplastic polymers (4, 5) and both components (2, 4) separated at least partly, which requires limited force. As each component (2, 4) substantially retains most of its surface properties, the separated components may subsequently be welded again in accordance with the invented method. If desired, additional thermoplastic material may be added between the thermoplastic surfaces to be bonded, in case insufficient thermoplastic material is available for good bonding.

An assembly 1 bonded according to the invention may further provide additional advantages such as an improved chemical resistance, improved wear and erosion resistance, improved biocompatibility, improved frictional properties, and the like.

It will be understood that the invention as disclosed in the detailed description is only given by way of example and that many variations may be envisaged by the skilled person within the scope of the appended claims.

The invention claimed is:

1. A method for bonding a thermoplastic polymer to a thermosetting polymer component, the method comprising the steps of:

a) providing a thermoplastic polymer, b) providing a cured thermosetting polymer component comprising an implant of a thermoplastic implant polymer at least at the part of the thermosetting polymer component to be bonded, c) locating the thermoplastic polymer in contact with at least the part to be bonded, d) heating the thermoplastic polymer and thermosetting polymer component at least in the area of contact to the melting temperature of the thermoplastic polymer, whereby the thermoplastic implant polymer melts and fuses with the thermoplastic polymer; and e) cooling the assembly of thermoplastic polymer and cured thermosetting polymer component such that the thermoplastic polymer is bonded to the cured thermosetting polymer component, wherein the thermoplastic polymer has a melting temperature that exceeds the curing temperature of the thermosetting polymer of the cured thermosetting polymer component, wherein the heat applied to melt the thermoplastic polymer to be bonded and the thermoplastic implant polymer is located substantially at an interface to be welded, and wherein the implant is designed such that heating above the maximum operating temperature of the thermosetting polymer at an interface of the implant with the thermosetting polymer is avoided during the bonding step d) by maintaining a temperature gradient in the thermoplastic implant polymer during thermal bonding by welding such that the temperature at the interface of the implant with the thermosetting polymer is sufficiently low not to substantially degrade the thermosetting polymer, even when heating is above such degradation temperature, and by applying heat sinks to parts of the implant, which heat sinks are directly applied onto the implant, and which heat sinks are removed after bonding.

2. Method according to claim 1, wherein the heat sinks are applied externally to the implant.

3. Method according to claim 1, wherein the heat sinks are applied at the outer edges of the implant.

4. Method according to claim 1, wherein the implant comprises reinforcing fibers that extend into the thermosetting polymer.

5. Method according to claim 1, wherein the thermoplastic polymer is provided in the form of a cured thermosetting polymer component comprising an implant of the thermoplastic polymer.

6. Method according to claim 1, wherein the cured thermosetting polymer component comprising the thermoplastic implant polymer is obtained by providing an uncured or partly cured thermosetting polymer component having a curing temperature below the melting temperature of the thermoplastic polymer, and heating the thermoplastic polymer and thermosetting polymer component to the curing temperature of the thermoset polymer, whereby the uncured or partly cured thermosetting polymer component and the thermoplastic polymer of the implant at least partly interpenetrate.

7. Method according to claim 1, wherein the thermosetting polymer component comprises a fiber-reinforced thermosetting polymer composite component.

8. Method according to claim 1, wherein the thermoplastic polymer to be bonded is a thermoplastic polymer component or a component with a compatible thermoplastic polymer surface.

9. Method according to claim 1, wherein the thermoplastic polymer to be bonded and/or the thermoplastic polymer of the implant is selected from the class of engineering thermoplastic polymers having a melting temperature of at least 200° C.

10. Method according to claim 9, wherein the thermoplastic polymer to be bonded and/or the thermoplastic polymer of the implant is selected from polyetherimide (PEI), polyetheretherketone (PEEK), polyphenylene sulphide (PPS), polyetherketone (PEK), polyetherketoneketone (PEKK) and combinations or equivalents thereof.

11. Method according to claim 1, wherein the thermoplastic polymer to be bonded or the thermoplastic polymer of the implant comprises electrical conductive particles for localised heating.

12. Method according to claim 1, wherein the thermosetting polymer comprises an epoxy and/or bismaleimide resin/hardener mixture.

* * * * *